US009617912B2

(12) United States Patent
Satou

(10) Patent No.: US 9,617,912 B2
(45) Date of Patent: Apr. 11, 2017

(54) MULTI-LINK ENGINE

(75) Inventor: Yuusuke Satou, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 1346 days.

(21) Appl. No.: 13/123,697

(22) PCT Filed: Sep. 29, 2009

(86) PCT No.: PCT/IB2009/006995
§ 371 (c)(1),
(2), (4) Date: Apr. 11, 2011

(87) PCT Pub. No.: WO2010/046741
PCT Pub. Date: Apr. 29, 2010

(65) Prior Publication Data
US 2011/0192371 A1 Aug. 11, 2011

(30) Foreign Application Priority Data

Oct. 20, 2008 (JP) ................................. 2008-270149

(51) Int. Cl.
F02B 75/32 (2006.01)
F02B 75/04 (2006.01)
(Continued)

(52) U.S. Cl.
CPC ............ F02B 75/048 (2013.01); F16F 15/24 (2013.01); F02B 75/06 (2013.01)

(58) Field of Classification Search
CPC .......... F02B 75/048; F02B 75/06; F16F 15/24
(Continued)

(56) References Cited

U.S. PATENT DOCUMENTS 6,390,035 B2 * 5/2002 Moteki et al. ............ 123/78 BA
6,510,821 B2 * 1/2003 Fujimoto et al. ........... 123/48 B
(Continued)

FOREIGN PATENT DOCUMENTS

JP 2001-227367 8/2001
JP 2002-129995 A 5/2002
(Continued)

OTHER PUBLICATIONS

An English translation of the Japanese Office Action of corresponding Japanese Application No. JP 2008-270149, dated Apr. 9, 2012, mailed Apr. 17, 2012.
(Continued)

Primary Examiner — Hung Q Nguyen
Assistant Examiner — Omar Morales
(74) Attorney, Agent, or Firm — Global IP Counselors, LLP

(57) ABSTRACT

A multi-link engine is provided with an upper link, a lower link and a control link. The upper link is pivotally connected to a piston by a piston pin. The lower link is rotatably mounted on a crankpin of a crankshaft and connected to the upper link by an upper pin. The control link is rotatably connected to the lower link by a control pin and pivotally mounted on a pivot portion of a control shaft. The links are configured and arranged with respect to each other such that inertia forces of a prescribed second or higher order in terms of an engine rotational speed act on at least the upper link and the control link in a transverse direction of the engine with a sum of leftward and rightward inertia forces of the prescribed second or higher order being substantially zero.

14 Claims, 11 Drawing Sheets

(51) Int. Cl.
*F16F 15/24* (2006.01)
*F02B 75/06* (2006.01)

(58) Field of Classification Search
USPC ............... 123/197.4, 78 E, 48 B, 48 R, 78 R
See application file for complete search history.

(56) References Cited

U.S. PATENT DOCUMENTS

| | | |
|---|---|---|
| 6,877,463 B2 * | 4/2005 | Moteki et al. ............... 123/48 B |
| 2001/0017112 A1 | 8/2001 | Moteki et al. |
| 2002/0026910 A1 | 3/2002 | Hiyoshi et al. |
| 2008/0283008 A1 * | 11/2008 | Hiyoshi et al. ............ 123/90.17 |

FOREIGN PATENT DOCUMENTS

| | | |
|---|---|---|
| JP | 2006-046125 A | 2/2006 |
| JP | 2006-183483 | 7/2006 |
| JP | 2006-207634 A | 8/2006 |
| JP | 2008-064061 | 3/2008 |

OTHER PUBLICATIONS

An English translation of the Chinese Office Action for the corresponding Chinese application No. 200980141774.3 issued on Dec. 25, 2012.

The Mexican Office Action for the corresponding Mexican Application No. MX/a/2011/004275, issued on Mar. 7, 2014.

* cited by examiner

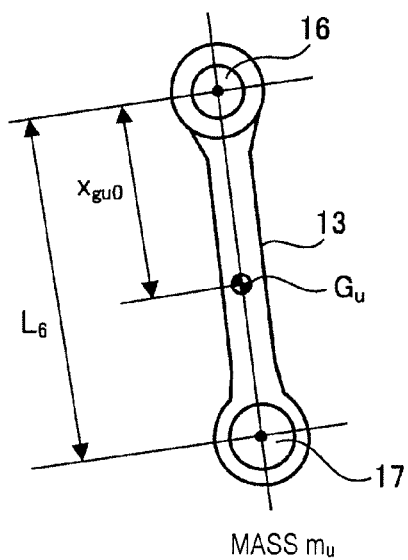
FIG. 3A
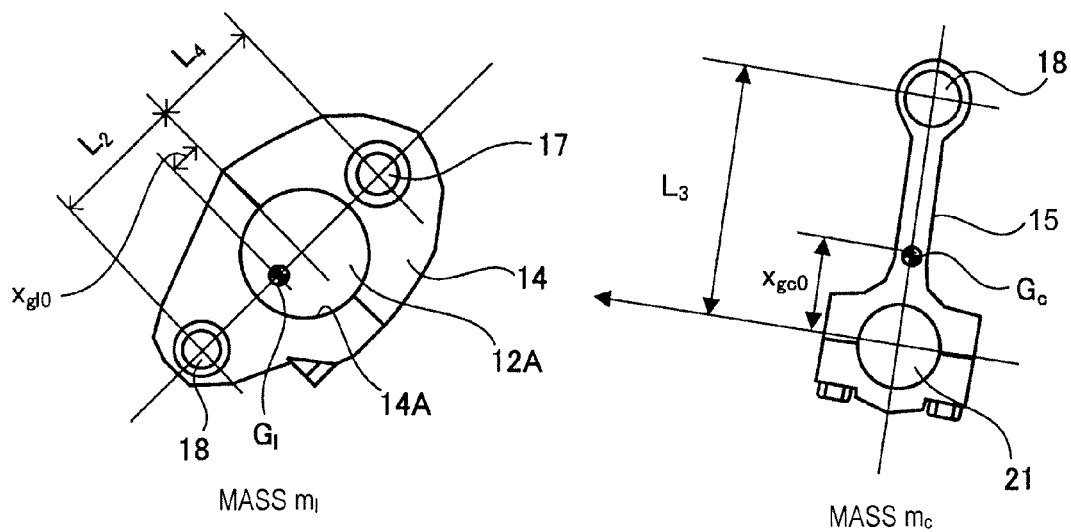
FIG. 3B
FIG. 3C

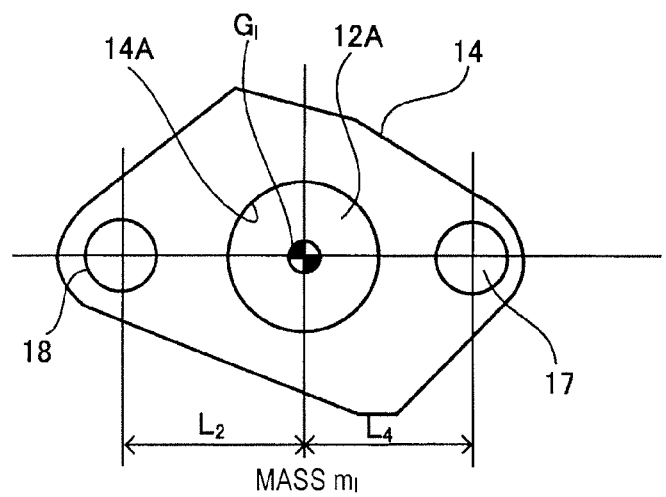
FIG. 7A
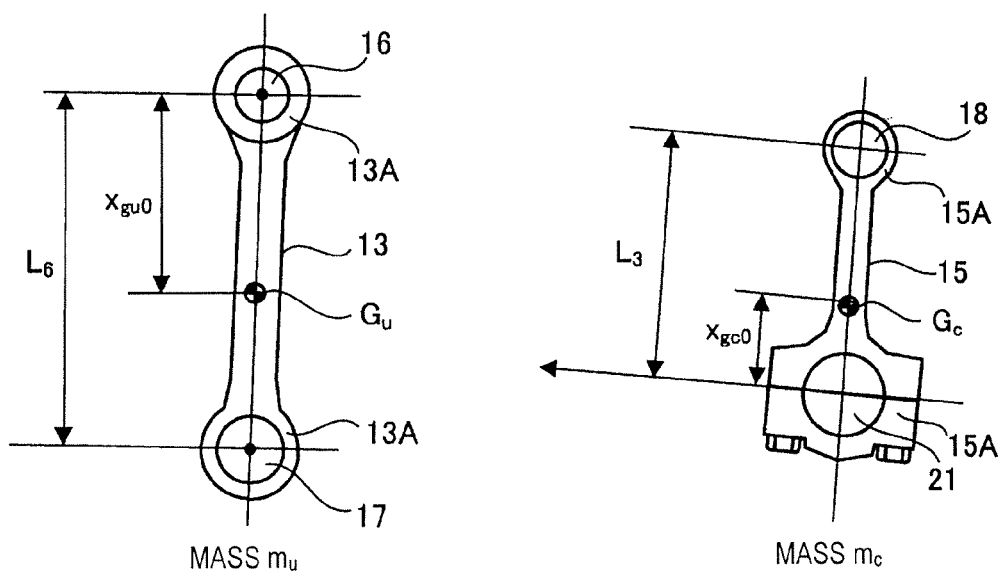
FIG. 7B
FIG. 7C

MULTI-LINK ENGINE

CROSS-REFERENCE TO RELATED APPLICATIONS

This U.S. National stage application claims priority to Japanese Patent Application No. 2008-270149, filed on Oct. 20, 2008. The entire disclosure of Japanese Patent Application No. 2008-270149 is hereby incorporated herein by reference.

BACKGROUND

Field of the Invention

The present invention generally relates to a multi-link engine. More specifically, the present invention relates to a vibration reducing structure that reduces vibration in a multi-link engine.

Background Information

Engines have been developed in which a piston pin and a crank pin are connected by a plurality of links (such engines are hereinafter called multi-link engines). For example, a multi-link engine is disclosed in Japanese Laid-Open Patent Publication No. 2006-207634. The multi-link engine of this patent publication is provided with an upper link and a lower link for connecting a piston to a crankshaft. The upper link is connected to a piston, which moves reciprocally inside a cylinder by a piston pin. The lower link is rotatably attached to a crank pin of a crankshaft and connected to the upper link with an upper link pin. A compression ratio of the multi-link engine is variably controlled by controlling an orientation of the lower link. The multi-link engine also has a control link with one end coupled to the lower link and the other end coupled to an eccentric portion of a control shaft. The orientation of the lower link is controlled through the control link by changing a rotational angle of the control shaft.

In view of the above, it will be apparent to those skilled in the art from this disclosure that there exists a need for an improved multi-link engine that reduces vibration in the multi-link engine. This invention addresses this need in the art as well as other needs, which will become apparent to those skilled in the art from this disclosure.

SUMMARY

It has been discovered that with the multi-link engine, as discussed above, vibrations occur not only in a movement direction of the piston but also in a direction oriented transversely with respect to a movement direction the piston (i.e., a direction oriented transversely leftward and rightward with respect to a piston movement direction when viewed from an axial direction of the crankshaft) due to inertia forces of the links. The transverse vibrations include, for example, a vibration component of a second order in terms of an engine rotational speed. The second order vibration problem is unique to multi-link engines. The second order vibration problem is not an issue in engines having a conventional piston-crankshaft structure in which the piston and the crankshaft are connected with a single connecting rod.

In this specification, the order of a vibration component is defined as a ratio of the period (inverse of frequency) of the vibration with respect to an amount of time required for one rotation of the engine (rotational period of the crankshaft). Specifically, a vibration is a first order vibration component if the period of the vibration is the same as the rotational period of the crankshaft. A vibration is a second order vibration if the period of the vibration is one-half the rotational period of the crankshaft, and so on for higher order vibration components.

The multi-link engine disclosed in the aforementioned patent publication has a second order balancer device provided below the crankshaft. The second order balancer device reduces second order vibrations in a direction oriented diagonally with respect to a piston movement direction by rotating a first balancer shaft and a second balancer shaft in a direction opposite to the rotational direction of the crankshaft. However, with the multi-link engine presented in the aforementioned patent publication, the cost is increased by the need to provide a separate second order balancer device and the fuel efficiency of the engine is degraded due to friction generated when the second order balancer device is driven.

The present invention was conceived in view of these problems. One object is to provide a simple vibration reducing structure for a multi-link engine that can reduce vibrations in a transversely oriented direction with respect to a piston movement direction.

In view of the above, a multi-link engine is provided that basically comprises an engine block body, a piston, an upper link, a lower link and a control link. The engine block body includes at least one cylinder. The piston is reciprocally disposed inside the cylinder of the engine block body. The upper link has a first end pivotally connected to the piston by a piston pin. The lower link is rotatably mounted on a crankpin of a crankshaft and connected to a second end of the upper link by an upper pin. The control link has a first end rotatably connected to the lower link by a control pin and a second end pivotally mounted on a pivot portion of a control shaft. The upper link, the lower link and the control link are configured and arranged with respect to each other such that inertia forces of a prescribed second or higher order in terms of an engine rotational speed act on at least the upper link and the control link in a transverse direction of the engine with a sum of leftward and rightward inertia forces of the prescribed second or higher order being substantially zero. The transverse direction is oriented transversely leftward and rightward with respect to a vertical piston movement direction when the multi-link engine is viewed along an axial direction of the crankshaft.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3A is a side elevational view of an upper link of the multi-link engine illustrated in FIG. 1A;

FIG. 3B is a side elevational view of a lower link of the multi-link engine illustrated in FIG. 1A;

FIG. 3C is a side elevational view of a control link of the multi-link engine illustrated in FIG. 1A;

FIG. 7 shows schematic views of an upper link, a lower link, and a control link of a multi-link engine according to a second embodiment;

FIG. 7A is a side elevational view of a lower of a multi-link engine according to a second embodiment;

FIG. 7B is a side elevational view of an upper link of the multi-link engine according to the second embodiment;

FIG. 7C is a side elevational view of a control link of the multi-link engine according to the second embodiment;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1A:
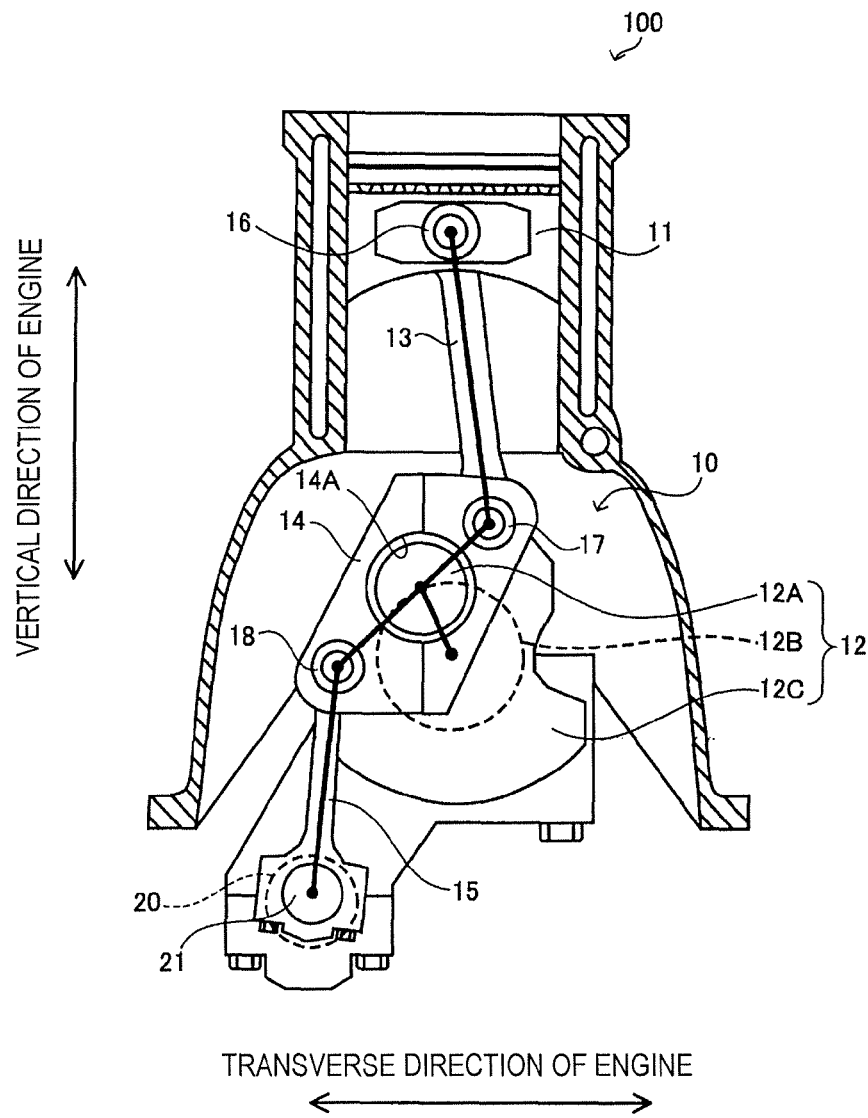
FIG. 1A is a schematic vertical cross sectional view of a multi-link engine according to a first embodiment.
Figure 1B:
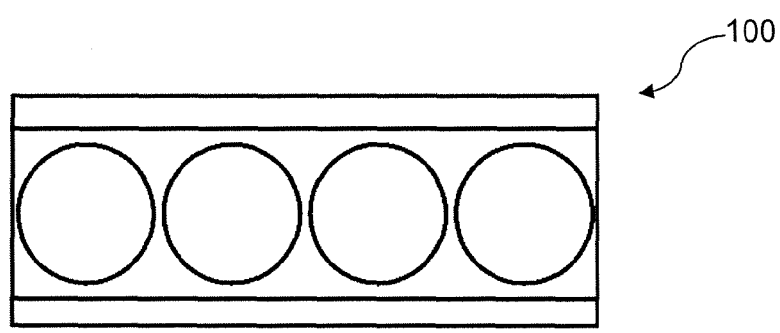
FIG. 1B is a schematic top plan view of the multi-link engine illustrated in FIG. 1A according to the first embodiment.

Referring initially to FIGS. 1A and 1B, selected portions of a multi-link engine 100 is illustrated in accordance with a first embodiment. In this illustrated embodiment, the multi-link engine 100 is a four-cylinder inline engine for a vehicle. However, only one cylinder will be illustrated in detail for the sake of brevity. Each of the cylinders of the multi-link engine 100 is equipped with a compression ratio varying mechanism 10 contrived to vary a compression ratio by changing a piston top dead center position. The multi-link engine 10 also includes a piston 11 for each cylinder and a crankshaft 12, with the compression ratio varying mechanisms 10 connecting the pistons 11 to the crankshaft 12. The crankshaft 12 includes a crankpin 12A, a journal 12B and a counterweight 12C for each of the piston 11. A center axis of the crankpin 12A is offset from a center axis of the journal 12B by a prescribed amount. The counterweight 12C is formed integrally with a crank arm and serves to reduce a first order vibration component of the piston 11 in terms of the engine rotational speed.

The compression ratio varying mechanism 10 includes an upper link 13, a lower link 14 and a control link 15. The upper link 13 and the lower link 14 are arranged to couple a piston 11 to a crankshaft 12. The compression ratio varying mechanism 10 is contrived to change a compression ratio by using the control link 15 to control an orientation of the lower link 14. An upper (first) end of the upper link 13 is coupled to the piston 11 by a piston pin 16. A lower (second) end of the upper link 13 is coupled to one end of the lower link 14 by an upper pin 17. Another end of the lower link 14 is coupled to the control link 15 by a control pin 18. Thus, the lower link 14 is coupled between the upper link 13 and the control link 15.

The lower link 14 is provided with a coupling hole 14A for supporting the lower link 14 on a crankpin 12A of the crankshaft 12. The coupling hole 14A is disposed at a position such that the crankpin 12A is located between a center axis of the upper pin 17 and a center axis of the control pin 18. The lower link 14 includes two members (a left-hand member and a right-hand member as seen in FIG. 1A) that can be separated from each other. The lower link 14 are configured such that the coupling hole 14A is located in an approximate middle of the lower link 14 between the left-hand member and the right-hand member. The crankpin 12A of the crankshaft 12 is disposed in the coupling hole 14A such that the lower link 14 pivots about the crankpin 12A.

An upper (first) end of the control link 15 is rotatably coupled to the lower link 14 with the control pin 18. A lower (second) end of the control link 15 is coupled to an eccentric shaft portion 21 of a control shaft 20. The eccentric shaft portion 21 constitutes a pivot shaft of the control shaft 20. The control link 15 pivots about the eccentric shaft portion 21. The control shaft 20 is rotatably supported in an engine block body that includes a plurality (four) of cylinders corresponding to the number of the pistons 11. The control shaft 20 is arranged to be parallel to the crankshaft 12. The eccentric shaft portion 21 is provided in such a position that a center axis of the eccentric shaft portion 21 is offset from a center axis of the control shaft 20 by a prescribed amount. The eccentric shaft portion 21 is moved by rotationally controlling the control shaft 20 with an actuator (not shown).

When the actuator (not shown) rotates the control shaft 20 such that the eccentric shaft portion 21 moves downward relative to the center axis of the control shaft 20, the lower link 14 pivots about the crankpin 12A such that the position of the upper pin 17 moves upward. As a result, the piston 11 moves upward and the compression ratio of the multi-link engine 100 increases. Conversely, when the eccentric shaft portion 21 moves upward relative to the center axis of the control shaft 20, the lower link 14 pivots about the crankpin 12A such that the position of the upper pin 17 moves downward. As a result, the piston 11 moves downward and the compression ratio of the multi-link engine 100 decreases.

When the multi-link engine 100 is operating in a high load region, the compression ratio of the multi-link engine 100 is set, for example, to a lower compression ratio regardless of the engine speed in order to prevent knocking. Conversely, when the multi-link engine 100 is operating in a low to medium load region where the risk of knocking is low, the compression ratio is set to a higher compression ratio in order to increase the engine output.

The sum of the inertia forces exerted by the upper link 13, the lower link 14 and the control link 15 in the multi-link engine 100 acts as a vibration driving force causing the body of the engine to vibrate both in a piston movement direction (vertical direction of the engine) and in a direction oriented transversely with respect to the piston movement direction (leftward and rightward directions of the engine). The transversely oriented vibrations of the engine include, for example, a second order vibration component and higher order vibration components related to the engine rotational speed as described above (i.e., the order of vibration is defined in terms of a fraction of a rotational period of the crankshaft). Such second and higher order vibrations are unique to multi-link engines.

In this embodiment, the effect of first order vibrations in the transverse direction of the engine 100 is small because the multi-link engine 100 is a four cylinder engine. Therefore, a goal is to reduce second and higher order vibrations. It is particularly necessary to reduce second order transverse vibrations, which cause muffled noise inside a vehicle cabin. Therefore, in this multi-link engine 100, the mass and shape of each of the links 13 to 15 and the arrangement of the links 13 to 15 are configured and arranged to distribute with respect to each other inertia forces of a prescribed second or higher order (in terms of the engine rotational speed) acting in a transverse direction of the engine at the centers of gravity of the upper link 13, the lower link 14, and the control link 15 such that a sum of the prescribed-order inertia forces acting in a leftward direction is substantially equal to a sum of the prescribed order inertia forces acting in a rightward direction.

Figure 2:
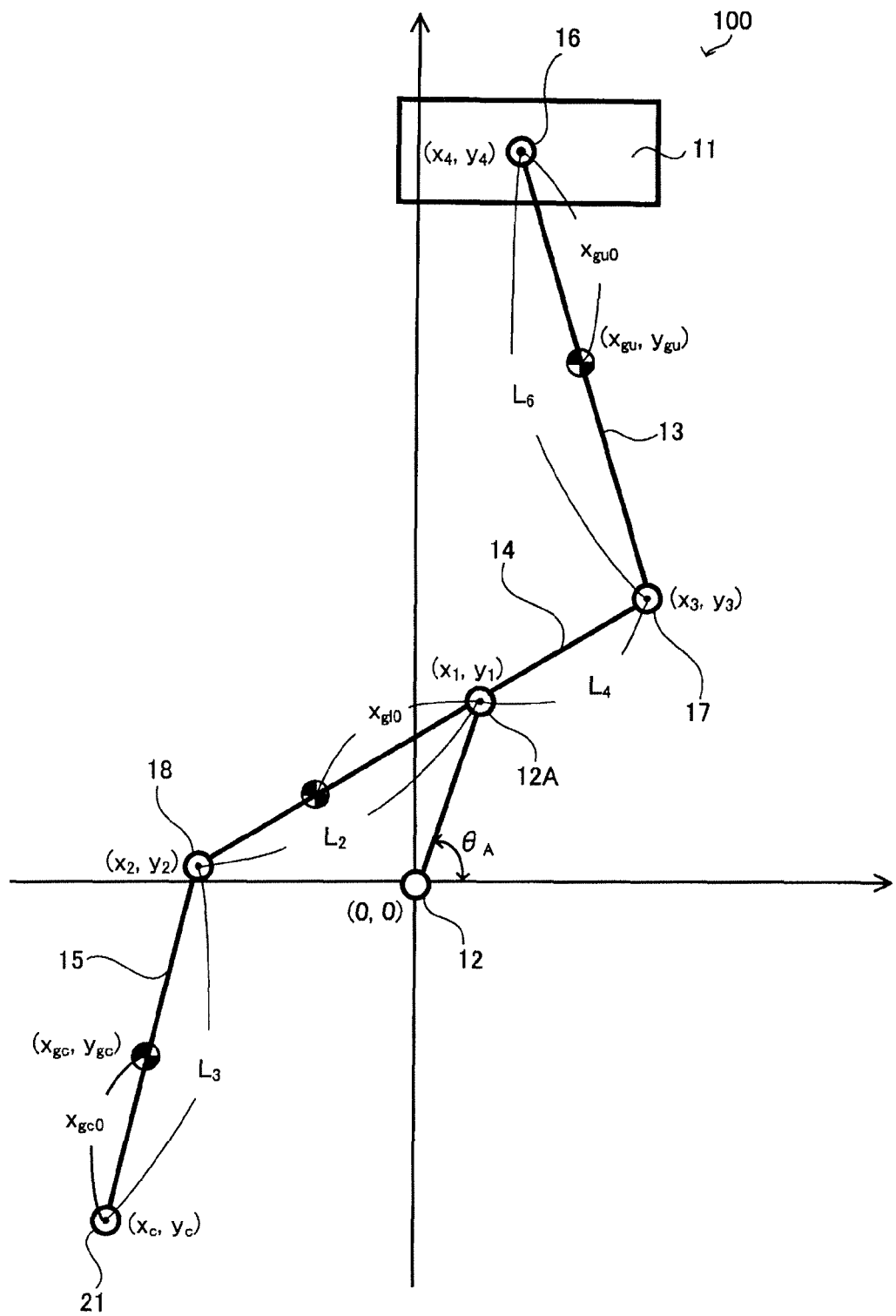
FIG. 2 is a link model diagram of the multi-link engine illustrated in FIG. 1A for calculating a sum of transversely oriented second order inertia forces acting at the centers of gravity of the links.

FIG. 2 is a model link diagram of the multi-link engine 100 for calculating a sum of transversely oriented second order inertia forces acting at the centers of gravity of the links. In FIG. 2, a Cartesian coordinate system is established having an origin (0, 0) positioned at a rotational center of the crankshaft 12, an X axis oriented along a transverse direction of the engine 100, and a Y axis oriented along a vertical direction of along a reciprocating axis of the pistons 11 of the engine 100.

As shown in FIG. 2, a center axis of the piston pin 16 is located at a position $(x_4, y_4)$, a center axis of the upper pin 17 is located at a position $(x_3, y_3)$, a center axis of the crankpin 12A is located at a position $(x_1, y_1)$, a center axis of the control pin 18 is located at a position $(x_2, y_2)$, and a center axis of the eccentric shaft portion 21 of the control shaft 20 is located at a position $(x_c, y_c)$.

The upper link 13 has a mass $m_u$ and a length $L_6$ between the center axis of the piston pin 16 and the center axis of the upper pin 17. The center of gravity $G_u$ of the upper link 13 is positioned on or near a line passing through the center axis of the piston pin 16 and the center axis of the upper pin 17, but, for simplicity, it is assumed that the center of gravity $G_u$ of the upper link 13 is positioned at a point along the line segment joining the center axis of the piston pin 16 and the center axis of the upper pin 17. A distance $x_{gu0}$ exists between the center axis of the piston pin 16 and the center of gravity $G_u$ of the upper link 13. The distance $x_{gu0}$ is defined to be positive on the upper pin side of the center axis of the piston pin 16 and negative on the opposite side of the center axis of the piston pin 16.

The lower link 14 has a mass a length $L_4$ between the center if the upper pin 17 and the center axis of the crankpin 12A, and a length $L_2$ between the center axis of the crankpin 12A and the center axis of the control pin 18. As mentioned above, the coupling hole 14A of the lower link 14 supports the lower link 14 on a crankpin 12A of the crankshaft 12. The coupling hole 14A is disposed at a position such that the crankpin 12A is located between the center axis of the upper pin 17 and the center axis of the control pin 18. Consequently, both the center of gravity $G_l$ of the lower link 14 and the center axis of the crankpin 12A installed in the coupling hole 14A are positioned on or near a straight line that passes through the center axis of the upper pin 17 and the center axis of the control pin 18. For simplicity, it is assumed that the center of gravity $G_l$ and the center axis of the crankpin 12A are each positioned at a point along the line segment joining the center axis of the upper pin 17 and the center axis of the control pin 18. A distance $x_{gl0}$ exists between the center axis of the crankpin 12A and the center of gravity $G_l$ of the lower link 14. The distance $x_{gl0}$ is defined to be positive on the control pin side of the center axis of the crankpin 12A and negative on the upper pin side of the center axis of the crankpin 12A.

The control link 15 has a mass $m_c$ and a length $L_3$ between the center axis of the control pin 18 and the center axis of the eccentric shaft portion 21. The center of gravity $G_c$ of the control link 15 is positioned on or near a line passing through the center axis of the control pin 18 and the center axis of the eccentric shaft portion 21, but, for simplicity, it is assumed that the center of gravity $G_c$ of the control link 15 is positioned at a point along the line segment joining the center axis of the control pin 18 and the center axis of the eccentric shaft portion 21. A distance $x_{gc0}$ exists between the center axis of the eccentric shaft portion 21 and the center of gravity $G_c$ of the control link 18. The distance $x_{gc0}$ is defined to be positive on the control pin side of the center axis of the eccentric shaft portion 21 and negative on the opposite side of the eccentric shaft portion 21.

The effects that the upper pin 17 and the control pin 18 have with respect to the inertia forces can be taken into account by assuming that the upper pin 17 and the control pin 18 each constitute a portion of one of the links when determining the mass and center of gravity position of each of the links. An angle formed between the X axis and a line passing through the rotational center of the crankshaft 12 and the center axis of the crankpin 12A is defined to be a crank angle $\theta_4$.

When calculating a sum of the second order and higher order inertia forces acting in a transverse direction of the engine at the centers of gravity of the links using a model like that explained above, a first step is to find a transverse displacement $x_{gl}$ of the center of gravity $G_l$ of the lower link 14, a transverse displacement $x_{gu}$ of the center of gravity $G_u$ of the upper link 13, and a transverse displacement $x_{gc}$ of the center of gravity $G_c$ of the control link 15.

The transverse (leftward or rightward) displacements $x_{gl}$, $x_{gu}$, and $x_{gc}$ of the centers of gravity of the links are expressed as shown in the equations (1) to (3) below.

$$x_{gl} = \frac{L_2 - x_{gl0}}{L_2} x_1 + \frac{x_{gl0}}{L_2} x_2 \quad (1)$$

$$x_{gu} = \frac{x_{gu0}}{L_6} \frac{L_4 + L_2}{L_2} x_1 - \frac{x_{gu0}}{L_6} \frac{L_4}{L_2} x_2 + \frac{L_6 - x_{gu0}}{L_6} x_4 \quad (2)$$

$$x_{gc} = \frac{x_{gc0}}{L_3}(x_2 - x_c) \quad (3)$$

In the equations, $x_2$ is a transverse displacement of the control pin 18 and can be separated into a first order displacement $x_{2L}$ and a second and higher order displacement $x_{2H}$ as shown in the equation (4) below. The first order displacement $x_{2L}$ and the second and higher order displacement $x_{2H}$ are each calculated based on the crank angle $\theta_A$ and constants $A_n$ and $B_n$ determined based on the shapes and other characteristics of the links.

$$x_2 = x_{2L} + x_{2H}$$

$$x_{2L} = A_0 + A_1 \cos(\theta_A + B_1)$$

$$x_{2H} = A_2 \cos(2\theta_A + B_2) + A_3 \cos(3\theta_A + B_3) + A_4 \cos(4\theta_A + B_4) + \ldots \quad (4)$$

Since the crankshaft 12 has a flywheel provided on a shaft end portion thereof to suppress rotational vibration, the transverse displacement $x_1$ of the crankpin 12A is expressed only in terms of a first order displacement and the second and higher order displacements $x_{1H}$ are zero, as shown in the equation (5) below.

$$x_1 = x_{1L} = L_1 \cos \theta_A$$

$$x_{1H} = 0 \quad (5)$$

The piston pin 16 does not undergo any displacement in a transverse direction of the engine because the piston 11 moves reciprocally in a sliding fashion inside a cylinder. Consequently, the second and higher order displacement $x_{4H}$ of the piston pin 16 in a transverse direction of the engine is zero, as shown in the equation (6) below.

$$x_{4H} = 0 \quad (6)$$

The eccentric shaft portion 21 moves when the control shaft 20 rotates, but the movement speed of the eccentric shaft portion 21 is smaller than the engine rotational speed and the eccentric shaft portion 21 can be assumed to be fixed. Consequently, the second and higher order displacement $x_{cH}$ of the eccentric shaft portion 21 in a transverse direction of the engine is zero, as shown in the equation (7) below.

$$x_{cH} = 0 \quad (7)$$

If the equations (1) to (3) are revised based on the equations (4) to (7) regarding the second and higher order transverse displacements, then the second and higher order displacements $x_{glH}$ of the center of gravity $G_l$ of the lower link 14, the second and higher order displacements $x_{guH}$ of the center of gravity $G_u$ of the upper link 13, and the second and higher order displacements $x_{gcH}$ of the center of gravity $G_c$ of the control link 15 are expressed as shown in the equations (8) to (10) below.

$$x_{glH} = \frac{x_{gl0}}{L_2} x_{2H} \quad (8)$$

$$x_{guH} = -\frac{x_{gu0}}{L_6} \frac{L_4}{L_2} x_{2H} \quad (9)$$

$$x_{gcH} = \frac{x_{gc0}}{L_3} x_{2H} \quad (10)$$

A sum $F_{es}$ of the second order and higher order inertia forces acting in a transverse direction of the engine at the centers of gravity of the links is then expressed according to the equation (11) below based on the masses $m_l$, $m_u$, $m_c$ of the links and equations (8) to (10). In the equation (11), the first expression on the right side indicates an inertia force of the lower link 14, the second expression on the right side expresses an inertia force of the control link 15, and the third expression on the right side indicates an inertia force of the upper link 13.

$$F_{es} = m_l \ddot{x}_{glH} + m_c \ddot{x}_{gcH} + m_u \ddot{x}_{guH} \quad (11)$$

$$= m_l \frac{x_{gl0}}{L_2} \ddot{x}_{2H} + m_c \frac{x_{gc0}}{L_3} \ddot{x}_{2H} - m_u \frac{x_{gu0}}{L_6} \frac{L_4}{L_2} \ddot{x}_{2H}$$

Second and higher order vibration driving forces acting to vibrate the engine body in a transverse direction of the engine can be eliminated and transversely oriented second and higher order vibrations can be suppressed by making the sum $F_{es}$ of transversely oriented second and higher order inertia forces expressed by the equation (11) zero, i.e., by satisfying the equation (12) below. In other words, the transverse vibrations can be suppressed by distributing the second order inertia forces acting in a transverse direction of the engine 100 such that a sum of the second order inertia forces acting in a leftward direction is substantially equal to a sum of the second order inertia forces acting in a rightward direction.

$$m_l \frac{x_{gl0}}{L_2} + m_c \frac{x_{gc0}}{L_3} - m_u \frac{x_{gu0}}{L_6} \frac{L_4}{L_2} = 0 \quad (12)$$

Therefore, in the multi-link engine 100 according to this embodiment, the mass and shape of each of the upper link 13, the lower link 14, and the control link 15 are determined so as to satisfy the equation (12).

FIGS. 3A to 3B shows a set of links 13, 14 and 15 designed to satisfy the equation (12). FIG. 3A shows the upper link 13. FIG. 3B shows the lower link 14. FIG. 3C shows the control link 15.

As shown in FIG. 3A, the upper link 13 has a mass $m_u$ and a length $L_6$ between the center axis of the piston pin 16 and the center axis of the upper pin 17. The upper link 13 is a rod-like member having a three-dimensional shape configured to be generally symmetrical with respect to a plane that includes the center axis of the piston pin 16 and the center axis of the upper pin 17. The center of gravity $G_u$ of the upper link 13 is located on or near a line passing through the center axis of the piston pin 16 and the center axis of the upper pin 17 and positioned between the center axis of the piston pin 16 and the center axis of the upper pin 17. A distance $x_{gu0}$ exists between the center axis of the piston pin 16 and the center of gravity $G_u$ of the upper link 13.

As shown in FIG. 3B, the lower link 14 has a mass $m_l$, a length $L_4$ between the center axis of the upper pin 17 and the center axis of the crankpin 12A, and a length $L_2$ between a center axis of the crankpin 12A and a center axis of the control pin 18. As mentioned above, the coupling hole 14A is formed in the lower link 14 at a position such that the crankpin 12A is located between the center axis of the upper pin 17 and the center axis of the control pin 18 and on or near a line passing through the center axis of the upper pin 17 and the center axis of the control pin 18. Thus, the lower link 14 is configured such that a portion thereof ranging from the coupling hole 14A to the upper pin 17 is substantially symmetrical to a portion thereof ranging from the coupling hole 14A to the control pin 18 and the center of gravity $G_l$ is arranged on or near a line passing through the center axis of the upper pin 17 and the center axis of the control pin 18. More specifically, the center of gravity $G_l$ of the lower link 14 is located on or near a line passing through the center axis of the upper pin 17 and the center axis of the control pin 18. Also the center of gravity $G_l$ of the lower link 14 is positioned between the center axis of the control pin 18 and the center axis of the crankpin 12A. A distance $x_{gl0}$ exists between the center axis of the crankpin 12A and the center of gravity $G_l$ of the lower link 14.

As shown in FIG. 3C, the control link 15 has a mass $m_c$ and a length $L_3$ between the center axis of the control pin 18 and the center axis of the eccentric shaft portion 21. The control link 15 is a rod-like member having a three-dimensional shape configured to be generally symmetrical with respect to a plane that includes the center axis of the control pin 18 and the center axis of the eccentric shaft portion 21. The center of gravity $G_c$ of the control link 15 is positioned between the center axis of the control pin 18 and the center axis of the eccentric shaft portion 21 on or near a line passing through the center axis of the control pin 18 and the center axis of the eccentric shaft portion 21. A distance $x_{gc0}$ exists between the center axis of the eccentric shaft portion 21 and the center of gravity $G_c$ of the control link 15.

If the mass, distance between pins, and the position of the center of gravity (expressed as a distance from a center of a prescribed pin) of each of the links are set such that the equation (12) is satisfied, then second and higher order vibrations oriented in the transverse direction of the multi-link engine 100 will be suppressed.

Figure 4A:
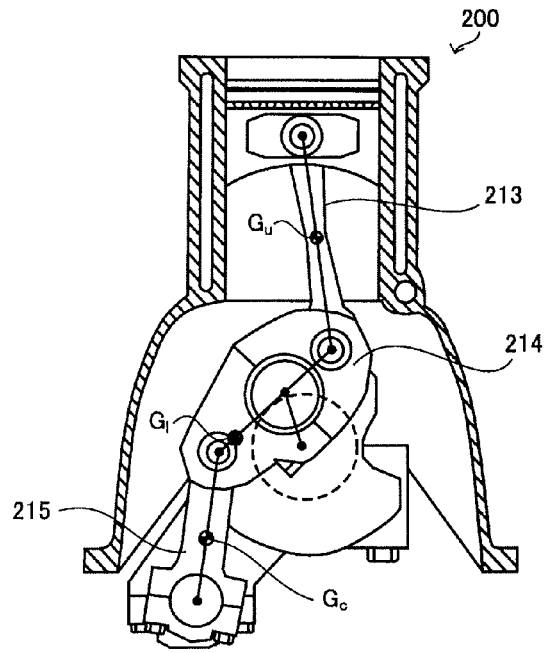
FIG. 4A is a schematic vertical cross sectional view of a comparative example of a multi-link engine.
Figure 4B:
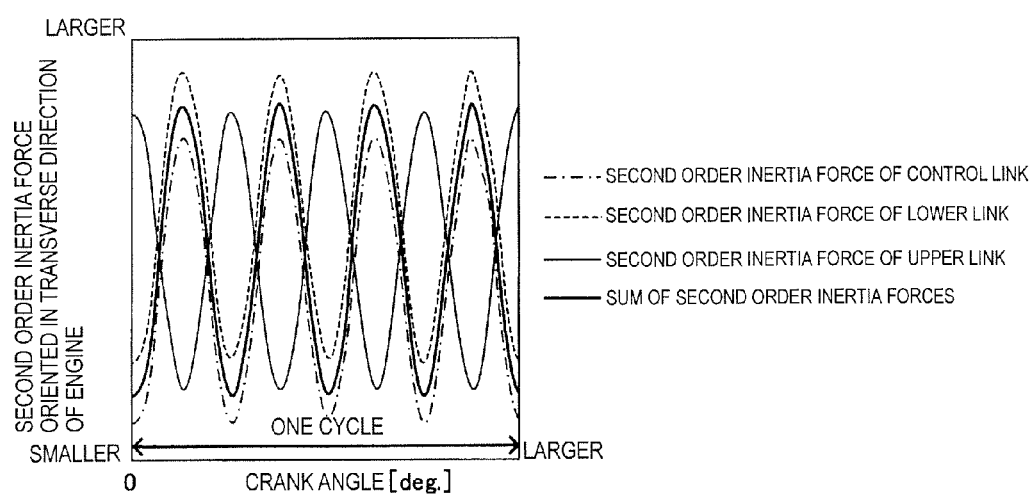
FIG. 4B is a plot of transversely oriented second order inertia forces acting at the centers of gravity of the links of the multi-link engine in the comparative example of FIG. 4A.
Figure 5:
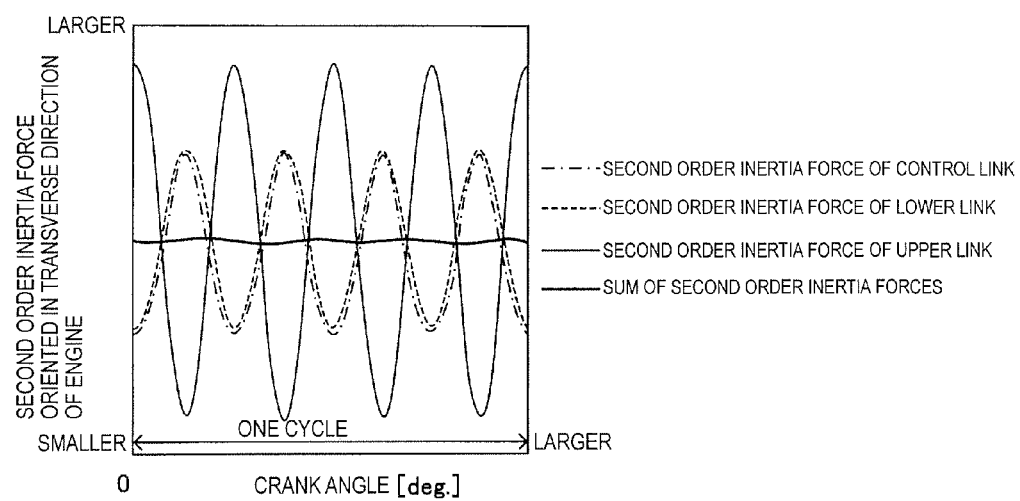
FIG. 5 is a plot of transversely oriented second order inertia forces acting at the centers of gravity of the links of the multi-link engine illustrated in FIG. 1A.

Effects of the multi-link engine 100 will now be explained with reference to FIGS. 4A, 4B and 5. FIG. 4A shows a comparative example of a multi-link engine 200 that does not satisfy the equation (12) and serves as a comparative example with respect to the multi-link engine 100. FIG. 5 shows the transversely oriented second order inertia forces acting in the multi-link engine 100. FIG. 4B shows the transversely oriented second order inertia forces acting in the multi-link engine 200.

The multi-link engine 200 shown in FIG. 4A is basically the same as the multi-link engine 100, except that the mass of the upper link 213 is smaller than the mass of the upper link 13, the mass of the control link 215 is larger than the mass of the control link 15 and the distance from the center axis of the crankpin to the center of gravity of the lower link 214 is longer than the corresponding distance in the multi-link engine 100. The mass of the lower link 214 is larger than the mass of the upper link 213 and larger than the mass of the control link 215. With such a configuration, the equation (12) is difficult to satisfy because the absolute value of the two positive expressions (first and second expressions) on the left side of the equation (12) tends to be larger than the absolute value of the negative expression (third expression). Since the multi-link engine 200 does not satisfy the equation 12, the leftward second order inertia forces and the rightward second order inertial forces acting on the links are not balanced and the sum of the second order inertia forces cannot be reduced. Consequently, the multi-link engine 200 incurs second order vibrations in a transverse direction of the engine.

Conversely, the links of the multi-link engine 100 are configured to satisfy the equation (12). As shown in FIG. 5, the magnitude of the second order inertia force of the lower link 14 (first expression on the left side of the equation (12)) and the magnitude the second order inertia force of the control link 15 (third expression on the left side of the equation (12)) are each approximately one-half the magnitude of the second order inertia force of the upper link 13 (second expression on the left side of the equation (12)). Thus, at any particular crank angle, the sum of the leftward second order inertia forces of the links is substantially equal to the sum of the rightward second order inertia forces of the links. In other words, the sum of the second order inertia forces acting in a transverse (leftward or rightward) direction of the engine at the centers of gravity of the links is substantially zero. As a result, the resultant second order vibration driving force acting to vibrate the body of the multi-link engine 100 is substantially zero and second order vibrations oriented in a transverse direction of the multi-link engine 100 are suppressed.

Although the preceding explanation focuses on vibrations that are second order in terms of the engine rotational speed, further reduction of muffled cabin noise can be achieved by distributing at least one other prescribed order of inertia forces that have a higher order than second order and act in a transverse direction with respect to a piston movement direction such that a sum of leftward prescribed-order inertial forces of the links and a sum of rightward prescribed-order inertial forces of the links are substantially equal. In a multi-link engine 100 according to this embodiment, since the links are configured to satisfy the equation (12), there are higher orders of vibration that are also suppressed in addition to second order vibrations.

Effects that a multi-link engine 100 according to the first embodiment can achieve will now be explained. These effects are possible due to the aspects explained in the preceding paragraphs.

In the multi-link engine 100, the masses and shapes of the upper link 13, the lower link 14, and the control link 15 are set such that a sum of second order inertia forces acting on the upper link 13, the lower link 14 and the control link 15 in a transverse direction of the engine body is substantially zero, i.e., such that the equation (12) is satisfied. As a result, secondary and higher order vibrations oriented in a transverse direction of the engine can be reduced with a simple structure.

In this embodiment, in order to satisfy the equation (12), it is preferable for the center of gravity $G_l$ of the lower link 14 and the center axis of the crankpin 12A disposed in the coupling hole 14A to be located on a line passing through the center axis of the upper pin 17 and the center axis of the control pin 18. However, due to various restrictions, it is conceivable that the lower link 14 might have to be configured such that the center of gravity $G_l$ and the center axis of the crankpin 12A are positioned near but not on the line passing through the center axis of the upper pin 17 and the center axis of the control pin 18.

Figure 6A:
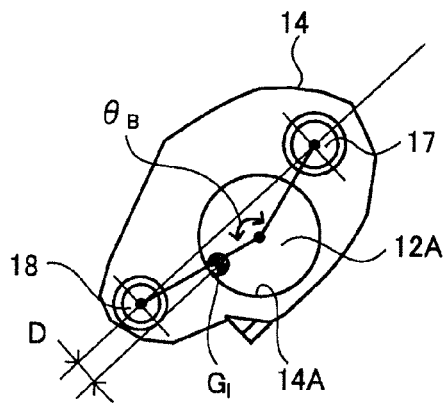
FIG. 6A is a side elevational view of the lower link of the multi-link engine illustrated in FIG. 1A, which illustrates the center of gravity of the lower link.
Figure 6B:
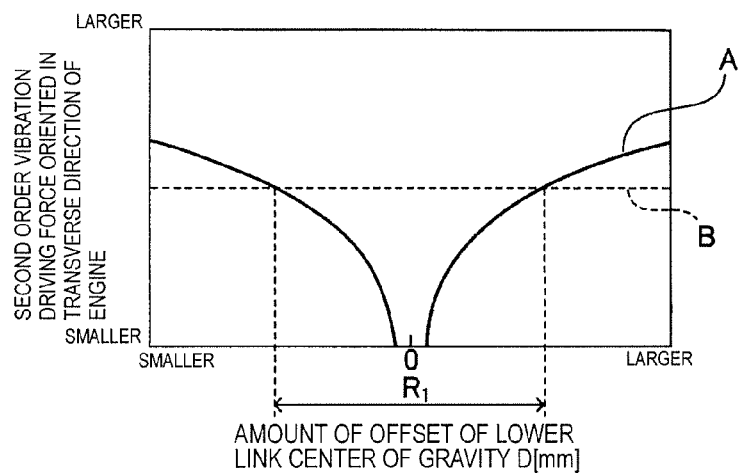
FIG. 6B is a plot illustrating a relationship between a center of gravity of a lower link and a second order transverse vibration driving force.

FIG. 6B is a plot illustrating a relationship between an offset amount D (see FIG. 6A) of the center of gravity $G_l$ of the lower link 14 and a second order vibration driving force (i.e., a sum of the second order transverse inertia forces of the links) for a case in which the center of gravity $G_l$ of the lower link 14 is offset from the line passing through the center axis of the upper pin 17 and the center axis of the control pin 18. The offset amount D of the center of gravity $G_l$ of the lower link 14 is expressed as a distance between center of gravity $G_l$ and the line passing through the center axis of the upper pin 17 and the center axis of the control pin 18.

With the multi-link engine 100, the second order transverse vibration driving force increases as the offset amount D from the center of gravity $G_l$ of the lower link 14 to the line passing through the center axis of the upper pin 17 and the center axis of the control pin 18 increases, as indicated by the solid-line curve A shown in FIG. 6B. However, within a range $R_1$ that spans several millimeters in a positive direction and a negative direction from a point corresponding to an offset amount D of 0 mm, the second order transverse vibration driving force is smaller than in the case of a multi-link engine (e.g., the comparative example shown in FIG. 4) in which the transverse inertia forces are not taken as a design consideration. The broken line B indicates the vibration driving force of a multi-link engine in which the transverse inertia forces are not taken as a design consideration. Thus, with the multi-link engine 100, so long as the offset amount D of the center of gravity $G_l$ of the lower link 14 is small, the links can be configured to satisfy the equation (12) and second and higher order vibrations oriented in the transverse direction of the engine can be reduced.

Figure 6C:
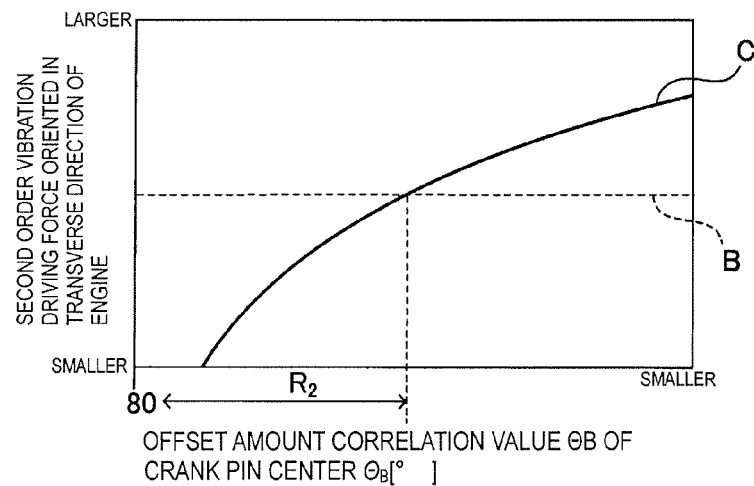
FIG. 6C is a plot illustrating a relationship between a center of a crankpin and a second order transverse vibration driving force.

FIG. 6C is a plot illustrating a relationship between an offset amount correlation value $\theta_B$ of the center axis of the crankpin 12A and a second order vibration driving force (i.e., a sum of the second order transverse inertia forces of the links) for a case in which the coupling hole 14A of the lower link 14 is formed such that the center axis of the crankpin 12A is offset from the line passing through the center axis of the upper pin 17 and the center axis of the control pin 18. The offset amount correlation value $\theta_B$ of the center axis of the crankpin 12A is expressed as an angle between a line passing through the center axis of the upper pin 17 and the center axis of the crankpin 12A and a line passing through the center axis of the control pin 18 and the center axis of the crankpin 12A.

With the multi-link engine 100, the second order transverse vibration driving force increases as the offset amount correlation value $\theta_B$ of the center axis of the crankpin 12A decreases from 180°, as indicated by the solid-line curve C shown in FIG. 6C. However, within a range $R_2$ of offset amount correlation values $\theta B$ spanning several tens of degrees in a positive direction from 180°, the second order transverse vibration driving force is smaller than in the case of a multi-link engine (e.g., the comparative example shown in FIG. 4) in which the transverse inertia forces are not taken as a design consideration (indicated with broken line B) and muffled noise, i.e., engine noise inside a vehicle cabin, can be reduced. Thus, with the multi-link engine 100, so long as the offset amount of the center axis of the crankpin 12A is small, the links can be configured to satisfy the equation (12) and second and higher order vibrations oriented in the transverse direction of the engine can be reduced.

Second Embodiment

Referring now to FIGS. 7A to 7C, the links 13, 14 and 15 of the multi-link engine 100 according to a second embodiment will now be explained. FIG. 7A shows the lower link 14. FIG. 7B shows the upper link 13. FIG. 7C shows the control link 15. The constituent features of a multi-link engine 100 according to the second embodiment are the same as in the first embodiment, except that the lower link 14 is configured differently. In view of the similarity between the first and second embodiments, only difference between the lower link 14 of the first and second embodiments will be explained. In other words, the descriptions of the parts of the second embodiment that are identical to the parts of the first embodiment have been omitted for the sake of brevity.

As shown in FIG. 7A, the coupling hole 14A is configured and arranged such that the center axis of the crankpin 12A will be arranged between the center axis of the upper pin 17 and the center axis of the control pin 18 on a line passing through the center axis of the upper pin 17 and the center axis of the control pin 18. Additionally, the lower link 14 is configured such that the center of gravity $G_l$ of the lower link 14 is coincident with the center axis of the crankpin 12A.

Thus, the distance $x_{gl0}$ from the center axis of the crankpin 12A to the center of gravity $G_l$ of the lower link 14 is zero. Additionally, the lower link 14 configured such that a portion thereof ranging from the coupling hole 14A to the upper pin 17 is substantially symmetrical to a portion thereof ranging from the coupling hole 14A to the control pin 18 and such that the length L4 from the center axis of the upper pin 17 to the center axis of the crankpin 12A is substantially equal to the length L2 from the center axis of the crankpin 12A to the center axis of the control pin 18.

When the distance $x_{gl0}$ is zero, the value of the first expression on the left side of the equation (12), i.e., the expression of the inertia forces acting on the lower link 14, is zero. Meanwhile, since the length L2 and the length L4 are substantially equal, the third expression on the left side of the equation (12), i.e., the expression of the inertia forces acting on the upper link 13, can be simplified. As a result, the equation (12) can be modified to the equation (13) shown below.

$$m_c \frac{x_{gc0}}{L_3} - m_u \frac{x_{gu0}}{L_6} = 0 \qquad (13)$$

If the mass, the distance between pins, and the position of the center of gravity (expressed as a distance from a center of a prescribed pin) of each of the upper link 13 and the control link 15 are set such that the equation (13) is satisfied, then second and higher order vibrations oriented in the transverse direction of the multi-link engine 100 will be suppressed.

In other words, the coupling hole 14A for coupling the crankpin 12A to the lower link 14 is formed such that the crankpin 12A is located between the center axis of the upper pin 17 and the center axis of the control pin 18. As a result, at least one order of vibration having a higher order than the second order in terms of the engine rotational speed and acting on the links in a transverse direction with respect to a piston movement direction is suppressed. Furthermore, the upper link 13 and the control link 15 are configured such that the product of the mass $m_u$ of the upper link 13 and the ratio of the distance $x_{gu0}$ from the center axis of the piston pin 16 to the center of gravity $G_u$ of the upper link 13 with respect to the length $L_6$ from the center axis of the piston pin 16 to the center axis of the upper pin 17 is substantially equal to (balanced with) the product of the mass $m_c$ of the control link 15 and the ratio of the distance $x_{gc0}$ from the center of the eccentric shaft portion 21 of the control shaft to the center of gravity $G_c$ of the control link 15 with respect to the length $L_3$ from the center axis of the control pin 18 to the center of the eccentric shaft portion 21 of the control shaft.

As shown in FIGS. 7B and 7C, the upper link 13 and the control link 15 are both rod-like members having substantially similar shapes and each having two coupling portions 13A or 15A. Consequently, the quotient obtained by dividing the distance $x_{gu0}$ from the center axis of the piston pin 16 to the center of gravity $G_u$ of the upper link 13 by the length $L_6$ from the center axis of the piston pin 16 to the center axis of the upper pin 17 is substantially equal to the quotient obtained by dividing distance $x_{gc0}$ from the center axis of the control shaft to the center of gravity $G_c$ of the control link 15 by the length $L_3$ from the center axis of the control pin 18 to the center axis of the eccentric shaft portion 21 of the control shaft. As a result, the equation (13) can be satisfied by making the mass $m_u$ of the upper link 13 substantially equal to the mass $m_c$ of the control link 15.

In this embodiment, the coupling hole 14A for coupling the crankpin 12A to the lower link 14 is formed such that the crankpin 12A is located between the center axis of the upper pin 17 and the center axis of the control pin 18 and the upper link 13 and the control link 15 are configured such that the mass of the upper link 13 and the mass of the control link 15 are substantially equal. As a result, at least one order of vibration having a higher order than the second order in terms of the engine rotational speed and acting on the links in a transverse direction with respect to a piston movement direction is suppressed.

Effects that a multi-link engine 100 according to the second embodiment can achieve will now be explained. These effects are possible due to the aspects explained in the preceding paragraphs.

With the multi-link engine 100 according to the second embodiment, the coupling hole 14A of the lower link 14 is formed such that the crankpin 12A is located between the center axis of the upper pin 17 and the center axis of the control pin 18 on a line passing through the center axis of the upper pin 17 and the center axis of the control pin 18, and the upper link 13 and the control link 15 are configured such that the mass $m_u$ of the upper link 13 and the mass $m_c$ of the control link 15 are substantially equal. As a result, the equation (13) is satisfied and second order and higher order vibrations oriented in the transverse direction of the engine can be suppressed in the same fashion as with the first embodiment.

Third Embodiment

Figure 8:
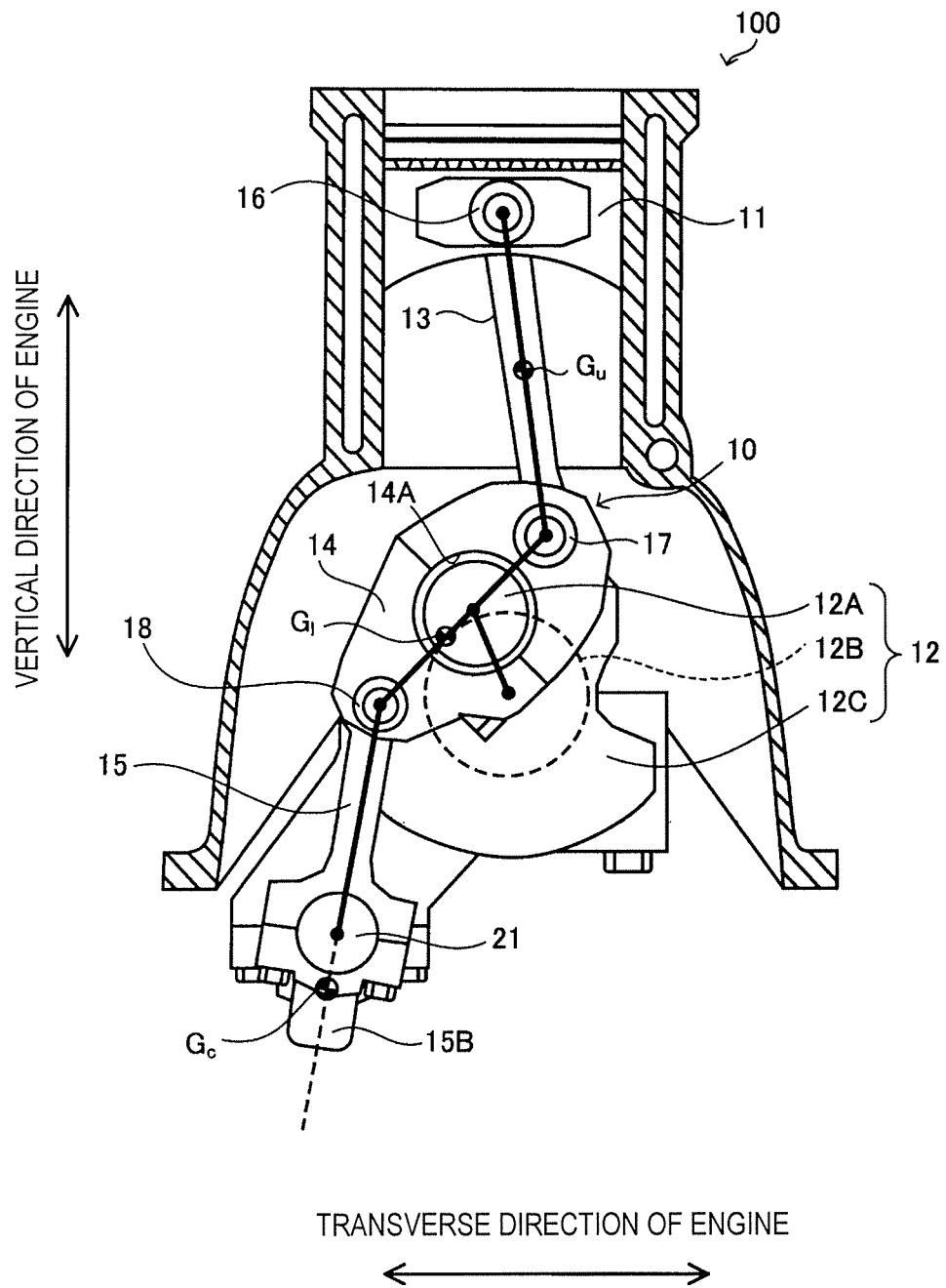
FIG. 8 is a schematic vertical cross sectional view of a multi-link engine according to a third embodiment.
Figure 9:
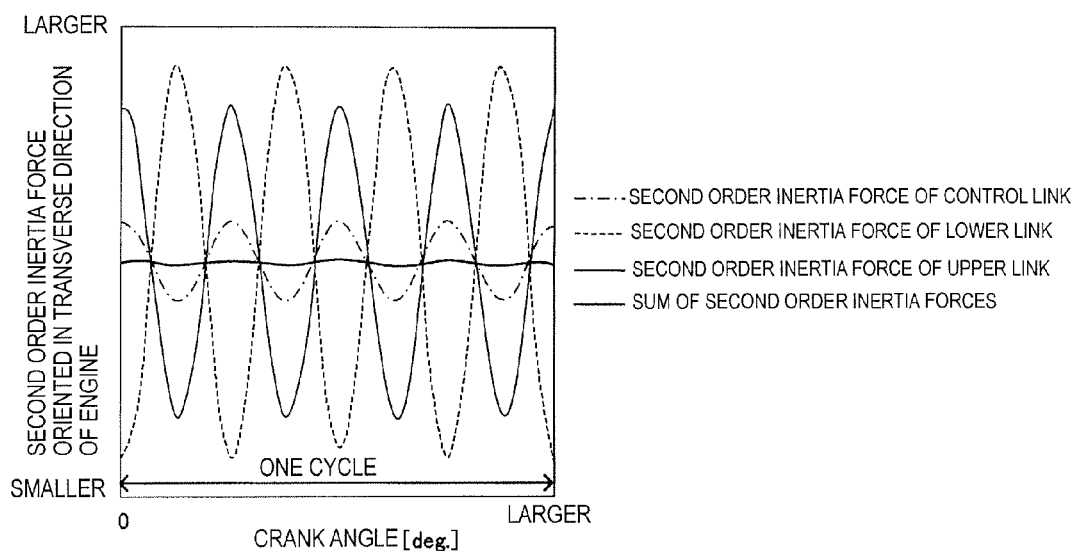
FIG. 9 is a plot of transversely oriented second order inertia forces acting at the centers of gravity of the links of the multi-link engine illustrated in FIG. 8.

A multi-link engine 100 according to a third embodiment will now be explained with reference to FIGS. 8 and 9. FIG. 8 is a schematic view of a multi-link engine 100 according to the third embodiment. FIG. 9 shows the transversely oriented second order inertia forces acting at the centers of gravity of the links of the multi-link engine 100. The multi-link engine 100 according to the third embodiment is basically the same as the first embodiment in that the links are configured to satisfy the equation (12). However, the control link 15 is configured differently. Specifically, in this embodiment, a counterweight 15B is provided on the control link 15. The third embodiment will now be explained focusing on this difference.

As shown in the equation (11), among the second order and higher order inertia forces oriented in a transverse direction of the engine, the inertia forces acting on the lower link 14 and the control link 15 are oriented in the same direction (thus, both are given by positive expressions in the equation) and the inertia force acting on the upper link 13 is oriented in the opposite direction (and, thus, given by a negative expression in the equation). In order to counterbalance the sum of the inertia forces acting on the lower link 14 and the control link 15 with the inertia force acting on the upper link 13 and satisfy the equation (12), it is necessary to increase the mass of the upper link 13 such that the inertia force acting on the upper link 13 is quite large.

The multi-link engine 100 according to the third embodiment has a counterweight 15B that is provided on the control link 15 to make the sum of the inertia forces of the lower link 14 and the control link 15 as small as possible. As a result, second and higher order transverse vibrations are reduced using a simpler configuration to balance the inertia forces of the links. As shown in FIG. 8, the control link 15 of the multi-link engine 100 is provided with a counterweight 15B on an end portion near where the eccentric shaft is located. The counterweight 15B is configured and arranged such that the center of gravity $G_c$ of the control link 15 is set on a line passing through the center axis of the control pin 18 and the center axis of the eccentric shaft portion 21 supporting the control link 15 and on the opposite side of the center axis of the eccentric shaft portion 21 from the center axis of the control pin 18.

Setting the center of gravity $G_c$ of the control link 15 in such a position causes the transversely oriented behavior of the center of gravity $G_c$ to be opposite to the behavior of the center of gravity $G_c$ in the first embodiment. Consequently, as shown in FIG. 9, the direction of the second order transverse inertia force acting at the center of gravity $G_c$ of the control link 15 is opposite the direction of the inertia force acting on the center of gravity $G_l$ of the lower link 14 and the same as the direction of the inertia force acting on the center of gravity $G_u$ of the upper link 13. Thus, the distance $x_{gc0}$ from the center axis of the eccentric shaft portion 21 to the center of gravity $G_c$ of the control link 15 is a negative value and the control link expressions of the equations (11) and (12) (the first expression on the left side of the equation (12)) are negative.

Effects that a multi-link engine 100 according to the third embodiment can achieve will now be explained. These effects are possible due to the aspects explained in the preceding paragraphs.

The counterweight 15B of the multi-link engine 100 is provided on an end portion of the control link 15 near where the eccentric shaft portion 21 is located and contrived such that the center of gravity $G_c$ of the control link 15 is set on a line passing through the center axis of the control pin 18 and the center axis of the eccentric shaft portion 21 and on the opposite side of the center axis of the eccentric shaft portion 21 as the control pin 18. The mass of the lower link 14 tends to be larger than the mass of the control link 15 and, thus, the second order and higher order inertia forces tend to be large. However, the sum of the second and higher order inertia forces of the lower link 14 and the control link 15 can be reduced by configuring the links such that the direction of the second and higher order transverse inertia forces acting at the center of gravity $G_c$ of the control link 15 is opposite the direction of the same in the first and second embodiments. As a result, second and higher order transverse vibrations resulting from the behavior of the lower link 14 and the control link 15 can be reduced. Also, when the sum of the inertia forces of the lower link 14 and the control link 15, it is easier to balance out the second and higher order transverse inertia forces of the upper link 13 and, thus, the inertia forces of all the links can be balanced more easily.

In this multi-link engine 100, the sum of the second and higher order transverse inertia forces acting at the center of gravity $G_u$ of the upper link 13 and the center of gravity $G_c$ of the control link 15 is set to be equal to the second and higher order transverse inertia forces acting at the center of gravity $G_l$ of the lower link 14 such that the equation (12) is satisfied. As a result, as shown in FIG. 9, the sum of the second order transverse inertia forces is substantially zero. As a result, a second order vibration driving force acting to vibrate the body of the multi-link engine 100 is reduced and second order vibrations are suppressed.

Although the previous explanation based on FIG. 9 focuses on second order vibrations, similarly to the first embodiment, orders of vibration higher than second order vibrations are also suppressed in a multi-link engine 100 according to the third embodiment.

In the third embodiment, the counterweight 15B provided on the control link 15 is contrived such that the center of gravity $G_c$ of the control link 15 is set on a line passing through the center axis of the control pin 18 and the center axis of the eccentric shaft portion 21 and on the opposite side of the center axis of the eccentric shaft portion 21 as the control pin 18. Additionally, even when the center of gravity $G_c$ of the control link 15 is on a line passing through the center axis of the control pin 18 and the center axis of the eccentric shaft portion 21 and between the center axis of the control pin 18 and the center axis of the eccentric shaft portion 21, the center of gravity $G_c$ of the control link 15 can be moved closer to the center axis of the eccentric shaft portion 21 by providing a counterweight 15B on the control link 15. In this way, the distance $x_{gc0}$ from the center axis of the eccentric shaft portion 21 to the center of gravity $G_c$ of the control link 15 can be shortened such that the value of the control link expression in the equation (12) is decreased. As a result, the sum of the second and higher order inertia forces acting on the lower link 14 and the control link 15 can be reduced and second and higher order transverse vibrations can be reduced using a simpler configuration to balance the inertia forces of the links.

Fourth Embodiment

Figure 10A:
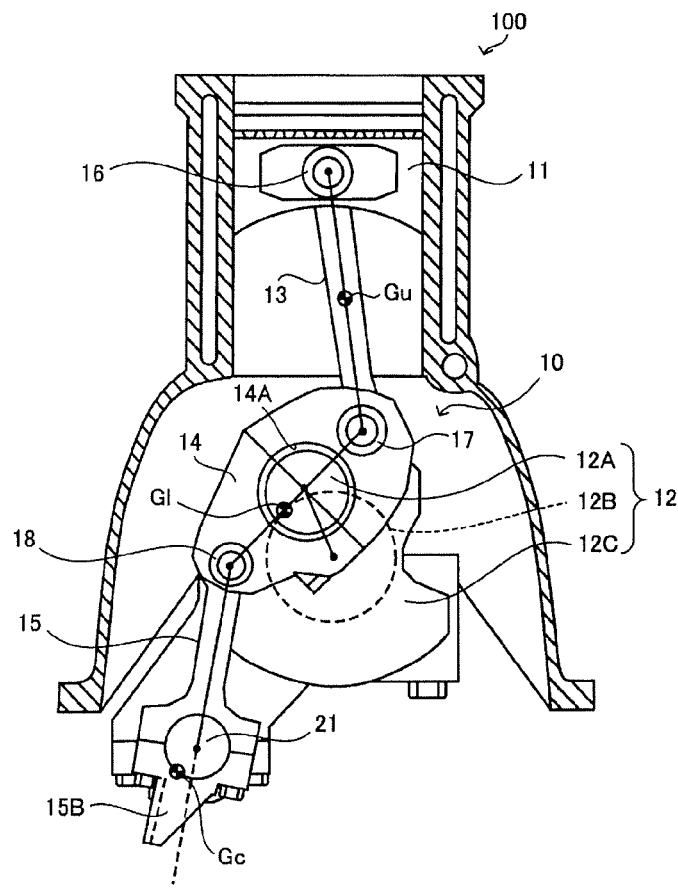
FIG. 10 is a schematic vertical cross sectional view of a multi-link engine according to a fourth embodiment.
Figure 10B:
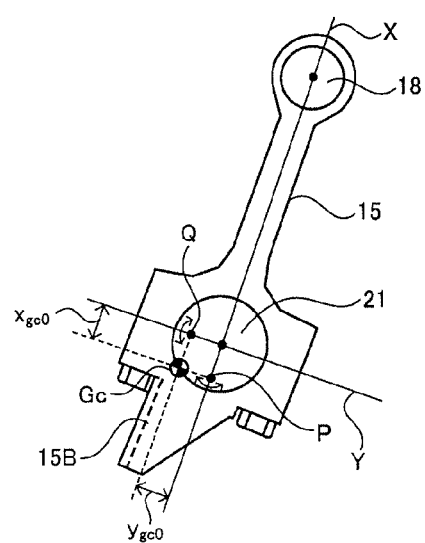
Figure 11A:
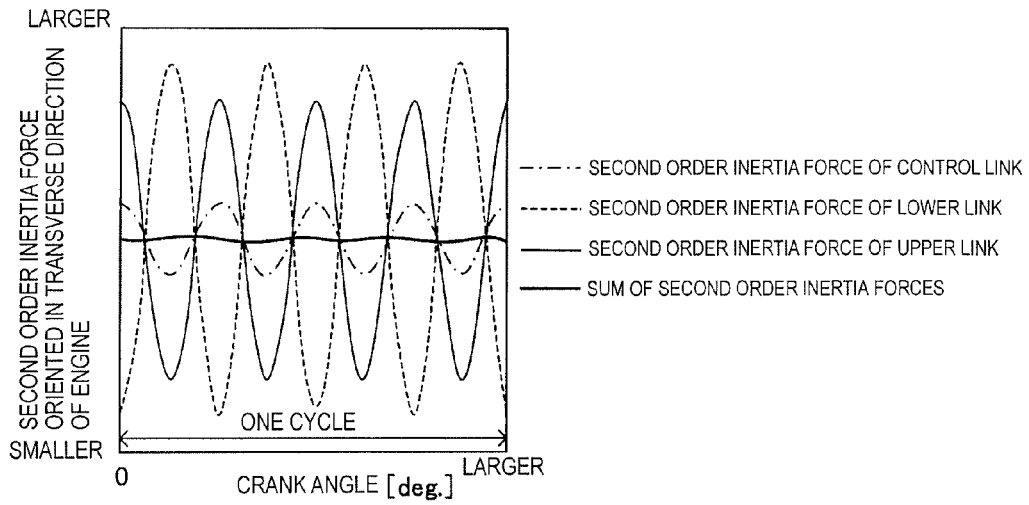
FIG. 11A is a plot of transversely oriented second order inertia forces acting at the centers of gravity of the links of the multi-link engine illustrated in FIG. 10.
Figure 11B:
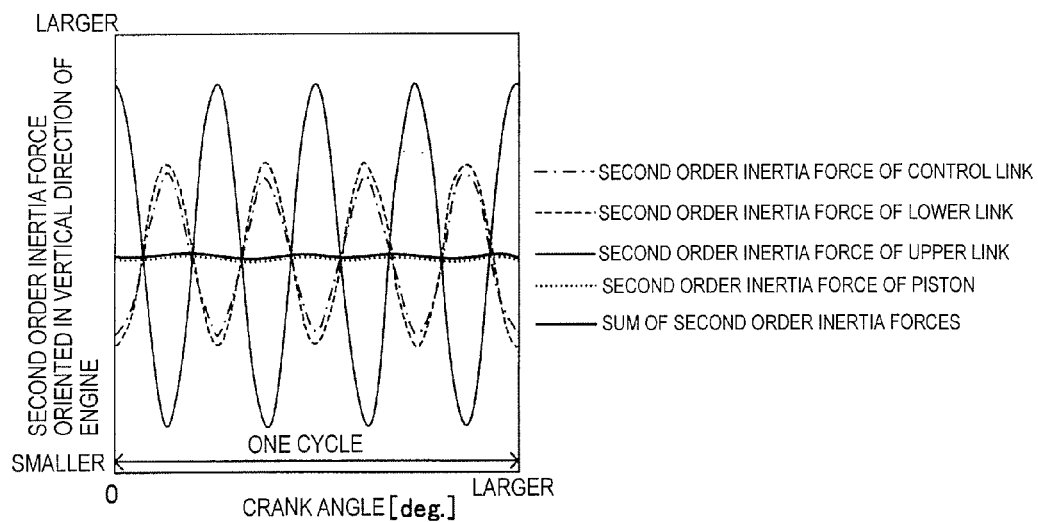
FIG. 11B is a plot of vertically oriented second order inertia forces acting at the centers of gravity of the links of the multi-link engine illustrated in FIG. 10.

A multi-link engine 100 according to a fourth embodiment will now be explained with reference to FIGS. 10A, 10B, 11A and 11B. FIG. 10A is schematic view of the multi-link engine 100 according to a fourth embodiment. FIG. 10B is a schematic view of a control link 15. FIG. 11A is a plot illustrating second order inertia forces acting on the links in a transverse direction of the engine. FIG. 11B is a plot illustrating second order inertia forces acting on the links in a vertical direction of the engine (piston movement direction). The constituent features of the multi-link engine 100 according to the fourth embodiment are the same as in the third embodiment, except that the position of the center of gravity of the control link 15 is different. Specifically, the control link 15 is provided with a counterweight 15B contrived such that the center of gravity $G_c$ of the control link 15 is offset from a line passing through the center axis of the control pin 18 and the center axis of the eccentric shaft portion 21. The fourth embodiment will now be explained focusing chiefly on this difference.

As shown in FIG. 10A, the control link 15 of the multi-link engine 100 is provided with a counterweight 15B on an end portion near where the eccentric shaft portion 21 is located. The counterweight 15B is configured such that when it is provided on the control link 15, the center of gravity $G_c$ of the control link 15 is located on the opposite side of the center axis of the eccentric shaft portion 21 as the control pin 18 in a position near but not on (i.e., slightly offset from) the line passing through the center axis of the control pin 18 and the center axis of the eccentric shaft portion 21.

As shown in FIG. 10B, the center of gravity $G_c$ of the control link 15 can be thought of as being separated into a center of gravity component P located on an X axis that passes through the center axis of the control pin 18 and the center axis of the eccentric shaft portion 21 and a center of gravity component Q located on a Y axis that passes through the center axis of the eccentric shaft portion 21 and is perpendicular to the X axis.

The center of gravity component P is located on the X axis on the opposite side of the Y axis as the control pin 18 and contributes to a transverse inertia force acting on the control link 15 as already explained in detail in the third embodiment. The direction of second and higher order transverse inertia forces acting at the center of gravity component P is opposite the direction of second order and higher order transverse inertia forces acting at the center of gravity $G_l$ of the lower link 14. Consequently, similarly to the third embodiment, second and higher order transverse vibrations can be reduced using a simpler configuration to balance the secondary and higher order inertia forces of the links, as shown in FIG. 11A.

Conversely, when the control link 15 pivots about the eccentric shaft portion 21, the center of gravity component Q oscillates in a vertical direction of the engine and contributes to an inertia force acting on the control link 15 in a vertical direction of the engine. Consequently, by adjusting the shape and mass of the counterweight 15B and the distance ygc0 from the center axis of the eccentric shaft portion 21 to the center of gravity component Q, a sum of second order inertia forces acting on the links 13 to 15 and the piston 11 in a vertical direction of the engine can be set to approximately zero and second order vertical vibration can be reduced, as shown in FIG. 11B.

Effects that a multi-link engine 100 according to the fourth embodiment can achieve will now be explained. These effects are possible due to the aspects explained in the preceding paragraphs.

In this multi-link engine 100, a counterweight 15B is provided on an end portion of the control link 15 near where the eccentric shaft portion 21 is located, and the counterweight 15B is contrived such that the center of gravity $G_c$ of the control link 15 is offset from a line passing through the center axis of the control pin 18 and the center axis of the eccentric shaft portion 21 and on the opposite side of the center axis of the eccentric shaft portion 21 as the control pin 18. As a result, both transverse vibrations and vertical vibrations can be reduced.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also as used herein to describe the above embodiment(s), the following directional terms "forward", "rearward", "above", "downward", "vertical", "horizontal", "below" and "transverse" as well as any other similar directional terms refer to those directions of a vehicle equipped with the multi-link engine. Accordingly, these terms, as utilized to describe the multi-link engine should be interpreted relative to a vehicle equipped with the multi-link engine. The terms of degree such as "substantially", "about" and "approximately" as used herein mean a reasonable amount of deviation of the modified term such that the end result is not significantly changed.

Among those skilled in the engine field, it is customary to use the expressions "top dead center" and "bottom dead center" irrespective of the direction of gravity. In horizontally opposed engines (flat engine) and other similar engines, top dead center and bottom dead center do not necessarily correspond to the top and bottom of the engine, respectively, in terms of the direction of gravity. Furthermore, if the engine is inverted, it is possible for top dead center to correspond to the bottom or downward direction in terms of the direction of gravity and bottom dead center to correspond to the top or upward direction in terms of the direction of gravity. However, in this specification, common practice is observed and the direction corresponding to top dead center is referred to as the "upward direction" or "top" and the direction corresponding to bottom dead center is referred to as the "downward direction" or "bottom."

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Moreover, although the first to fourth embodiments present examples a four cylinder engine, the invention can also be applied to a six cylinder engine to reduce third order transverse vibrations, which tend to be a problem in six cylinder engines. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A multi-link engine comprising:
an engine block body including at least one cylinder;
a piston reciprocally disposed inside the cylinder of the engine block body;
an upper link having a first end pivotally connected to the piston by a piston pin;
a lower link rotatably mounted on a crankpin of a crankshaft and connected to a second end of the upper link by an upper pin; and
a control link having a first end and a second end, the first end of the control link being rotatably connected to the lower link by a control pin and the second end of the control link being pivotally mounted on a pivot portion of a control shaft,
the upper link, the lower link and the control link being configured and arranged with respect to each other such that at least one kind of inertia force of a prescribed order among inertia forces of second or higher order in terms of an engine rotational speed act transversely leftward and rightward on the upper link, the lower link and the control link with respect to a piston movement direction, so a sum of transversely leftward and rightward inertia forces acting on the gravity center of the control link and the gravity center of the lower link are substantially equal to transversely leftward and rightward inertia forces acting on the gravity center of the upper link.

2. The multi-link engine as recited in claim 1, wherein the lower link includes a coupling hole disposed at a position with the crankpin disposed in the coupling hole such that the crankpin is located between a center axis of the upper pin and a center axis of the control pin.

3. The multi-link engine as recited in claim 2, wherein the crankpin includes a center axis that is arranged on a line joining the center axes of the upper pin and the control pin.

4. The multi-link engine as recited in claim 2, wherein the lower link has a center of gravity that is coincident with a center axis of the crankpin.

5. A multi-link engine comprising:
an engine block body including at least one cylinder;
a piston reciprocally disposed inside the cylinder of the engine block body;
an upper link having a first end pivotally connected to the piston by a piston pin;
a lower link rotatably mounted on a crankpin of a crankshaft and connected to a second end of the upper link by an upper pin; and
a control link having a first end rotatably connected to the lower link by a control pin and a second end pivotally mounted on a pivot portion of a control shaft,
the lower link having a coupling hole with the crankpin disposed in the coupling hole such that a center of gravity of the lower link and a center axis of the crankpin are both located on a line passing through a center axis of the upper pin and a center axis of the control pin and positioned between the center axes of the upper pin and the control pin,
the upper link, the lower link and the control link being configured and arranged with respect to each other to satisfy:

$$m_1 \frac{x_{gl0}}{L_2} + m_c \frac{x_{gc0}}{L_3} - m_u \frac{x_{gu0}}{L_6} \frac{L_4}{L_6} = 0,$$

where $m_l$ is a mass of the lower link, $x_{gl0}$ is a distance from the center axis of the crankpin to the center of gravity of the lower link, $L_2$ is a length from the center axis of the crankpin to the center axis of the control pin, $m_c$ is a mass of the control link, $x_{gc0}$ is a distance from a center axis of the pivot portion of the control shaft to a center of gravity of the control link, $L_3$ is a length from the center axis of the control pin to the center axis of the pivot portion of the control shaft, $m_u$ is a mass of the upper link, $x_{gu0}$ is a distance from a center axis of the piston pin to a center of gravity of the upper link, $L_4$ is a length from the center axis of the upper pin to the center axis of the crankpin, and $L_6$ is a length from the center axis of the piston pin to the center axis of the upper pin.

6. A multi-link engine comprising:
an engine block body including at least one cylinder;
a piston reciprocally disposed inside the cylinder of the engine block body;
an upper link having a first end pivotally connected to the piston by a piston pin;
a lower link rotatably mounted on a crankpin of a crankshaft and connected to a second end of the upper link by an upper pin; and
a control link having a first end rotatably connected to the lower link by a control pin and a second end pivotally mounted on a pivot portion of a control shaft,
the lower link having a coupling hole with the crankpin disposed in the coupling hole such that a center axis of the crankpin is located on a line passing through a center axis of the upper pin and a center axis of the control pin and positioned between the center axis of the upper pin and the center axis of the control pin, and the lower link having a center of gravity that is coincident with the center axis of the crankpin, the upper link and the control link being configured and arranged with respect to each other to satisfy:

$$m_c \frac{x_{gc0}}{L_3} - m_u \frac{x_{gu0}}{L_6} = 0,$$

where $m_c$ is a mass of the control link, $x_{gc0}$ is a distance from a center axis of the pivot portion of the control shaft to a center of gravity of the control link, $L_3$ is a length from the center axis of the control pin to a center axis of the pivot portion of the control shaft, $m_u$ is a mass of the upper link, $x_{gu0}$ is a distance from a center axis of the piston pin to a center of gravity of the upper link, and $L_6$ is a length from the center axis of the piston pin to a center axis of the upper pin.

7. The multi-link engine as recited in claim 6, wherein the upper link and the control link are configured such that the mass $m_u$ of the upper link and the mass $m_c$ of the control link are substantially equal.

8. A multi-link engine comprising:
an engine block body including at least one cylinder;
a piston reciprocally disposed inside the cylinder of the engine block body;
an upper link having a first end pivotally connected to the piston by a piston pin;
a lower link rotatably mounted on a crankpin of a crankshaft and connected to a second end of the upper link by an upper pin; and
a control link having a first rotatably connected to the lower link by a control pin that is disposed in a coupling hole of the lower link and a second end pivotally mounted on a pivot portion of a control shaft,
the crankpin being located between a center axis of the upper pin and a center axis of the control pin, and the upper link and the control link having substantially equal masses in order to suppress vibrations of a prescribed second or higher order in terms of an engine rotational speed that act on the links in a transverse direction of the engine, the transverse direction being oriented transversely leftward and rightward with respect to a vertical piston movement direction when the multi-link engine is viewed along an axial direction of the crankshaft.

9. A multi-link engine comprising:
an engine block body including at least one cylinder;
a piston reciprocally disposed inside the cylinder of the engine block body;
an upper link having a first end pivotally connected to the piston by a piston pin;
a lower link rotatably mounted on a crankpin of a crankshaft and connected to a second end of the upper link by an upper pin; and
a control link having a first end rotatably connected to the lower link by a control pin that is disposed in a coupling hole of the lower link and a second end pivotally mounted on a pivot portion of a control shaft,
the crankpin being located between a center axis of the upper pin and a center axis of the control pin, and the upper link and the control link being configured such that a product of a mass of the upper link and the ratio of a distance from a center axis of the piston pin to a center of gravity of the upper link with respect to a length from the center axis of the piston pin to a center axis of the upper pin is substantially equal to a product of a mass of the control link and the ratio of a distance from a center of a pivot portion to a center of gravity of the control link with respect to a length from a center axis of the control pin to the center axis of the pivot portion in order to suppress vibrations of a prescribed second or higher order in terms of an engine rotational speed that act on the upper link, the lower link and the control link in a transverse direction of the engine, the transverse direction being oriented transversely leftward and rightward with respect to a vertical piston movement direction when the multi-link engine is viewed from an axial direction of the crankshaft.

10. A multi-link comprising:
an engine block body including at least one cylinder;
a piston reciprocally disposed inside the cylinder of the engine block body;
an upper link having a first end pivotally connected to the piston by a piston pin;
a lower link rotatably mounted on a crankpin of a crankshaft and connected to a second end of the upper link by an upper pin; and
a control link having a first end rotatably connected to the lower link by a control pin, a second end pivotally mounted on a pivot portion of a control shaft, and a counterweight provided on an end portion nearer to where the pivot portion is located;
the upper link, the lower link and the control link being configured and arranged with respect to each other such that inertia forces of a prescribed second or higher order in terms of an engine rotational speed act on at least the upper link and the control link in a transverse direction of the engine with a sum of leftward inertia forces and a sum of rightward inertia forces of the prescribed second or higher order being substantially zero, the transverse direction being oriented transversely leftward and rightward with respect to a vertical piston movement direction when the multi-link engine is viewed along an axial direction of the crankshaft.

11. The multi-link engine as recited in claim 10, wherein the counterweight of the control link is arranged such that a center of gravity of the control link is positioned on a line passing through a center axis of the control pin and a center axis of the pivot portion of the control shaft, and such that the center of gravity of the control link is located on an opposite side of the center axis of the pivot portion of the control shaft from the center axis of the control pin.

12. The multi-link engine as recited in claim 10, wherein the counterweight of the control link is arranged such that the center of gravity of the control link is off set from a line passing through a center axis of the control pin and a center axis of the pivot portion of the control shaft.

13. The multi-link engine as recited in claim 10, wherein the counterweight of the control link is arranged such that a direction of the inertia force acting on the control link is opposite a direction of the inertia force acting on the lower link.

14. The multi-link engine as recited in claim 1, wherein the multi-link engine is a four cylinder engine.

* * * * *